C. B. ORR.
INNER TUBE FOR PNEUMATIC TIRES.
APPLICATION FILED JUNE 11, 1919.
1,424,135.
Patented July 25, 1922.
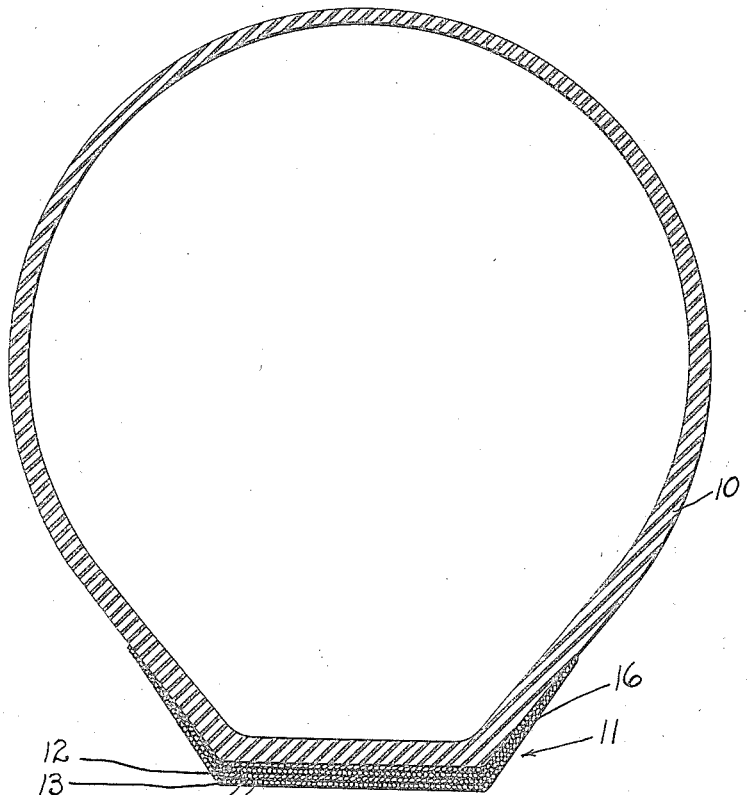
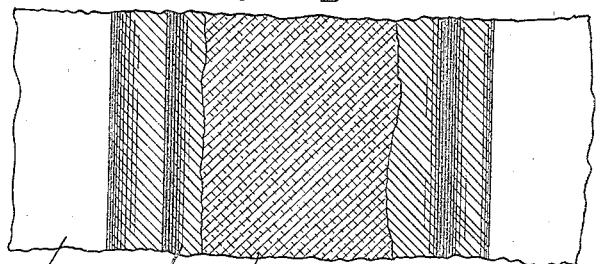
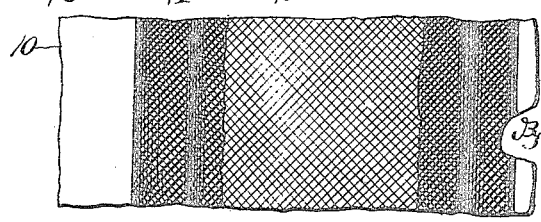
Inventor
Clifford B. Orr
his Attorney

UNITED STATES PATENT OFFICE.

CLIFFORD B. ORR, OF AKRON, OHIO, ASSIGNOR TO THE GOODYEAR TIRE & RUBBER COMPANY, OF AKRON, OHIO, A CORPORATION OF OHIO.

INNER TUBE FOR PNEUMATIC TIRES.

1,424,135.   Specification of Letters Patent.   Patented July 25, 1922.

Application filed June 11, 1919. Serial No. 303,404.

*To all whom it may concern:*

Be it known that I, CLIFFORD B. ORR, a citizen of the United States, and resident of Akron, Ohio, have invented new and useful Improvements in Inner Tubes for Pneumatic Tires, of which the following is a specification.

My invention relates to the construction of a new and useful inner tube for pneumatic tires which cannot only be more easily and quickly mounted in place, but one which can be more efficiently manufactured and will possess certain advantages over inner tubes now in use.

It has been customary in assembling a pneumatic tire on a wheel rim, to insert the flap by a separate operation, fitting it around the base of the inner tube between the latter and the shoe, and securing it in place by passing the valve stem of the tube through perforations provided in the flap and then over-lapping the ends of the flap more or less, to make it of proper length. Such practice is not only troublesome and time consuming, but there is always a tendency for the flap to loosen and become wrinkled, thus producing rubbing or friction, and consequent wear upon the tube, as well as causing an unequal distribution of pressure or pinching of the tube in places.

The primary object of my invention is, therefore, to avoid the objections and difficulties just referred to by providing an inner tube to which shall be equipped to perform all the functions usually performed by a flap and possess in addition advantages hitherto sought, but so far as I am aware, unattained.

It is a further object of my invention to provide an inner tube having a cord fabric element cemented thereto or vulcanized therewith so that the inner tube may be readily stretched over and fitted to rims having ununiform or irregular circumferential surfaces. The use of cord fabric in the practice of my invention has been found particularly advantageous because of the fact that such fabric possesses a greater degree of elasticity than the ordinary cross-woven fabric of which tire flaps are usually constructed.

In the drawings, wherein I have shown an inner tube made in accordance with my invention:

Figure 1 is a cross-section of the inner tube;

Fig. 2 is a fragmentary bottom plan view with portions broken away and showing the lay of the cords of the fabric; and Fig. 3 is a similar view illustrating the use of the cross-woven type of fabric comprehended by this invention.

The numeral 10 designates an inner tube of the usual type, to which in the course of manufacture, a flap 11 similar in part to the usual tire flap has been vulcanized or cemented, so as to form, as it were, an integral part of the tube.

The element 11, as shown in its preferred form, is composed of four plies, designated, respectively, 12, 13, 14 and 15, of cord fabric, cut on a bias and of such widths as to form a feathered or beveled joint 16 with the sides of the tube, thus producing a smooth outer surface. Cord fabric, it may be said, is fabric wherein the basic warp cords are held together and in place by light cross-threads arranged at intervals. These light cross-threads are merely for the purpose of preserving the basic cords in fabric shape during the tire building process, and are broken either during the vulcanization of the carcass or soon after the tire has been put in service on the road. The cord fabric is cut on a bias so that the cords thereof lie at an angle of approximately 45 degrees to a line passing circumferentially around the base of the tire, the cords of the superposed plies being at right angles to each other. This arrangement will permit, as will be seen, a certain amount of circumferential stretching of the plies of fabric constituting the protecting element.

From the above description, it will be seen that I have produced an improved inner tube having advantageous properties over those generally in use, in that it is constructed to perform together with its usual functions, those of the ordinary tire flap.

While I have shown plies of cord fabric as constituting the preferred embodiment of my invention, it will be understood that regular cross-woven fabric my be used in the manner illustrated in Fig. 3, but with loss to a certain degree of desirable elastic properties.

Although I have disclosed a specific embodiment of my invention and one logical modification thereof, I do not intend that the scope and extent thereof shall be limited except by the following claims.

What I claim is:

1. An inner tube having vulcanized therewith, so as to form an integral part thereof, a protecting element composed of several plies of fabric, of progressively increasing widths, that ply which is nearest the base portion of the tube being narrowest, so as to form a smooth feathered joint with the tube, for the purpose set forth.

2. An inner tube having vulcanized therewith, so as to form an integral part thereof, a protecting element composed of several plies of cord fabric, of progressively increasing widths, that ply which is nearest the base portion of the tube being narrowest, so as to form a smooth feathered joint with the tube, for the purpose set forth.

3. An inner tube having vulcanized therewith, so as to form an integral part thereof, a protecting element composed of several plies of cord fabric, the cords of which lie at an angle of substantially 45 degrees to a circumferential line, for the purpose set forth.

4. An inner tube having vulcanized therewith, so as to form an integral part thereof, a protecting element composed of several plies of cord fabric, of progressively increasing widths, that ply which is nearest the base portion of the tube being narrowest, so as to form a smooth feathered joint with the tube, and the cords of the fabric lying at an angle of substantially 45 degrees to a circumferential line, for the purpose set forth.

5. An inner tube for tires, having incorporated therewith a longitudinally stretchable element positioned exteriorly of the inner periphery thereof, and composed of laminated unwoven material whereby the tube is equipped to perform the function of a tire flap.

In witness whereof, I have hereunto signed my name in the presence of two subscribing witnesses.

CLIFFORD B. ORR.

Witnesses:
E. C. LEADENHAM,
C. A. STRAW, Jr.